United States Patent
Kitani et al.

(10) Patent No.: US 8,326,350 B2
(45) Date of Patent: Dec. 4, 2012

(54) COMMUNICATION TERMINAL (75) Inventors: Mitsuhiro Kitani, Yokohama (JP); Hidenori Sakaniwa, Kawasaki (JP)

(73) Assignee: NEC Casio Mobile Communications, Ltd., Kawasake, Kanagawa (JP)

(*) Notice: Subject to any disclaimer, the term of this patent is extended or adjusted under 35 U.S.C. 154(b) by 0 days.

(21) Appl. No.: 13/417,955

(22) Filed: Mar. 12, 2012

(65) Prior Publication Data

US 2012/0225696 A1  Sep. 6, 2012

Related U.S. Application Data (62) Division of application No. 11/441,714, filed on May 25, 2006, now Pat. No. 8,160,639.

(30) Foreign Application Priority Data

May 27, 2005  (JP) ................. 2005-155203

(51) Int. Cl.
*H04M 1/00* (2006.01)

(52) U.S. Cl. ............ 455/553.1; 455/422.1; 370/312; 370/328

(58) Field of Classification Search ........... 455/404, 455/412, 414.1, 414.2, 421; 370/278, 282, 370/312, 328
See application file for complete search history.

(56) References Cited

U.S. PATENT DOCUMENTS

| 6,741,293 | B1 | 5/2004 | Obuchi |
| 2002/0016162 | A1 | 2/2002 | Yoshihara et al. |
| 2005/0053094 | A1 | 3/2005 | Cain et al. |

FOREIGN PATENT DOCUMENTS

JP  2001-308856  11/2001

OTHER PUBLICATIONS

Kinoshita, S., "A Survey of Reliable Multicast Technology", Institute of Electronics, Information and Communication Engineers Journal, vol. J85-B, No. 11, pp. 1819-1842, Nov. 2002.

*Primary Examiner* — Jinsong Hu
*Assistant Examiner* — Nathan Taylor
(74) *Attorney, Agent, or Firm* — Cozen O'Connor (57) ABSTRACT A communication terminal optimally switches between the use of multicast reception and unicast reception, in consideration of the mobile radio environment of each terminal. For example, received signal strength indicator information is acquired at a received signal strength indicator information acquisition time calculated using a content reception time. Either multicast reception or unicast reception is selected according to the acquired received signal strength indicator information and content reception is performed. An optimal reception system can be selected and reception failure can be reduced. In addition, by performing a dynamic switching of reception methods as such, the base station-end can perform multicast delivery rather than unicast delivery when possible to communication terminals in favorable mobile radio environments, thereby significantly reducing the traffic load placed on communication paths.

5 Claims, 5 Drawing Sheets

COMMUNICATION TERMINAL

CROSS-REFERENCE TO RELATED APPLICATION

This application is a division of Ser. No. 11/441,714, filed May 25, 2006 now U.S. Pat. No. 8,160,639, which claims the benefit of priority from Japanese Patent Application No. 2005-155203, filed May 27, 2005, the entire contents of which are incorporated herein by reference.

BACKGROUND OF THE INVENTION

1. Field of the Invention

The present invention relates to a communication terminal that selects an optimal reception system and reduces reception failure.

2. Description of the Related Art

In recent years, services for delivering video and audio contents, etc. to a plurality of users by broadcast via a wired broadband circuit, such as Asymmetric Digital Subscriber Line (ADSL) and Fiber-To-The-Home (FTTH), are becoming popular. IP multicast technology, represented by Internet Group Management Protocol (IGMP), is used in multicast services such as these.

The IP multicast technology is an extremely effective means in one-to-many communication where the same contents are transmitted simultaneously to a plurality of receivers. Thus, the use of this technology is growing, not only in the field of wired communication, but also in the field of wireless communication. Technology as such is, for example, disclosed in the Japanese Laid-open Patent Publication No. 2001-308856.

In addition, as disclosed, for example, in the publication of The Institute of Electronics, Information and Communication Engineers Journal 2002/11, Vol. J85-B, No. 11, p 1823 to 1824, a communication technology, referred to as reliable multicast, that enhances reliability through the combined use of one-to-one unicast communication and one-to-many multicast communication is also known.

A reason for the combined use of multicast communication and unicast communication in the reliable multicast system is because multicast communication is favorable at times and unicast communication is favorable at other times depending on the mobile radio environment of individual terminals. For example, in a one-to-many, single-direction communication such as the multicast communication, the transmission rate is generally unilaterally decided by the transmitting-end. In this case, the probability of failure is high when multicast reception is being carried out because a communication terminal that has a weak received signal strength indicator and is strongly influenced by the effects of error factors, such as noise, interference, and attenuation. Therefore, it is preferable to perform reception for a terminal in a degraded mobile radio environment using the transmitting-end to acquire negotiation by one-to-one unicast and establishing communication suitable for the reception mobile radio environment of that terminal.

However, the method of combining and using multicast communication and unicast communication in the reliable multicast system is unique. In other words, when a reception terminal performs multicast communication, communication is performed through a predetermined combination regardless of the terminal being in an environment with high reception failure probability and as a result, reception failure may occur.

SUMMARY OF THE INVENTION

In accordance with an aspect of the present invention, there is provided a communication terminal which is capable of receiving a content file comprising: a content reception time acquisition means for acquiring a content reception time; a multicast reception means for receiving content by multicast delivery; a unicast reception means for receiving content by unicast delivery a received signal strength indicator acquisition time calculation means for calculating a received signal strength indicator information acquisition time using the content reception time acquired by the content reception time acquisition means; a received signal strength indicator acquisition means for acquiring received signal strength indicator information from a signal received by the communication terminal at the received signal strength indicator acquisition time calculated by the received signal strength indicator acquisition time calculation means; and a reception method judgment means for selecting either the multicast reception means or the unicast reception means according to the received signal strength indicator information acquired by the received signal strength indicator acquisition means and instructing content reception.

In accordance with another aspect of the present invention, there is provided a communication terminal which is capable of receiving content files, comprising: a multicast reception means for receiving content by multicast delivery; a unicast reception means for receiving content by unicast delivery; a content reception completion judgment means for judging whether a content reception was successful; a received signal strength indicator acquisition means for acquiring received signal strength indicator information from a signal received by the communication terminal; and a reception method judgment means for selecting either the multicast reception means or the unicast reception means according to the received signal strength indicator information acquired by the received signal strength indicator acquisition means and instructing content reception, when the content reception completion judgment means judges that the content reception was not completed successfully.

In accordance with another aspect of the present invention, there is provided a communication terminal which is capable of receiving content files, comprising: a content reception time acquisition means for acquiring a content reception time; a multicast reception means for receiving content by multicast delivery; a unicast reception means for receiving content by unicast delivery; a remaining battery level acquisition means for acquiring remaining battery level information on the remaining battery level for driving the communication terminal; a remaining battery level acquisition time calculation means for calculating the time at which the remaining battery level information is acquired using the content reception time information; a remaining battery level acquisition time judgment means for judging whether the current time is the time at which the remaining battery level information is acquired; and a reception method judgment means for selecting either the multicast reception means or the unicast reception means according to a judgment result of a reception method selection using the remaining battery level information and instructing content reception.

In accordance with another aspect of the present invention, there is provided a communication terminal which is capable of receiving content files, comprising: a multicast reception means for receiving content by multicast delivery; a unicast reception means for receiving content by unicast delivery; a content reception completion judgment means for judging whether a content reception was successful; a remaining battery level acquisition means for acquiring remaining battery level information on the remaining battery level for driving the communication terminal; and a reception method judgment means for selecting either the multicast reception means or the unicast reception means according to a judgment result of a reception method selection using the remaining battery level information and instructing content reception, when the content reception completion judgment means judges that the content reception was not completed successfully.

In accordance with another aspect of the present invention, there is provided a communication terminal which is capable of receiving content files, comprising: a content reception time acquisition means for acquiring a content reception time; a multicast reception means for receiving content by multicast delivery; a unicast reception means for receiving content by unicast delivery; a remaining battery level acquisition means for acquiring remaining battery level information on the remaining battery level for driving the communication terminal; a remaining battery level acquisition time calculation means for calculating the time at which the remaining battery level information is acquired using the content reception time information; a remaining battery level acquisition time judgment means for judging whether the current time is the time at which the remaining battery level information is acquired; a remaining battery level judgment means for judging whether or not there is remaining battery power using the remaining battery level information; a received signal strength indicator acquisition means for acquiring received signal strength indicator information from a signal acquired by the communication terminal; and a reception method judgment means for selecting either the multicast reception means or the unicast reception means, according to a judgment result of a reception method selection using the received signal strength indicator information and the judgment result of the remaining battery level judgment means, and instructing content reception.

In accordance with another aspect of the present invention, there is provided a communication terminal which is capable of receiving content files, comprising: a multicast reception means for receiving content by multicast delivery; a unicast reception means for receiving content by unicast delivery; a content reception completion judgment means for judging whether a content reception was successful; a remaining battery level acquisition means for acquiring remaining battery level information on the remaining battery level for driving the communication terminal; a remaining battery level judgment means for judging whether or not there is remaining battery power using the remaining battery level information, when the content reception completion judgment means judges that the content reception was not completed successfully; a received signal strength indicator acquisition means for acquiring received signal strength indicator information from a signal acquired by the communication terminal; and a reception method judgment means for selecting either the multicast reception means or the unicast reception means, according to a judgment result of a reception method selection using the received signal strength indicator information and the judgment result of the remaining battery level judgment means, and instructing content reception, when the content reception completion judgment means judges that the content reception was not completed successfully.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings.

A. First Embodiment

A-1. Configuration

Figure 1:
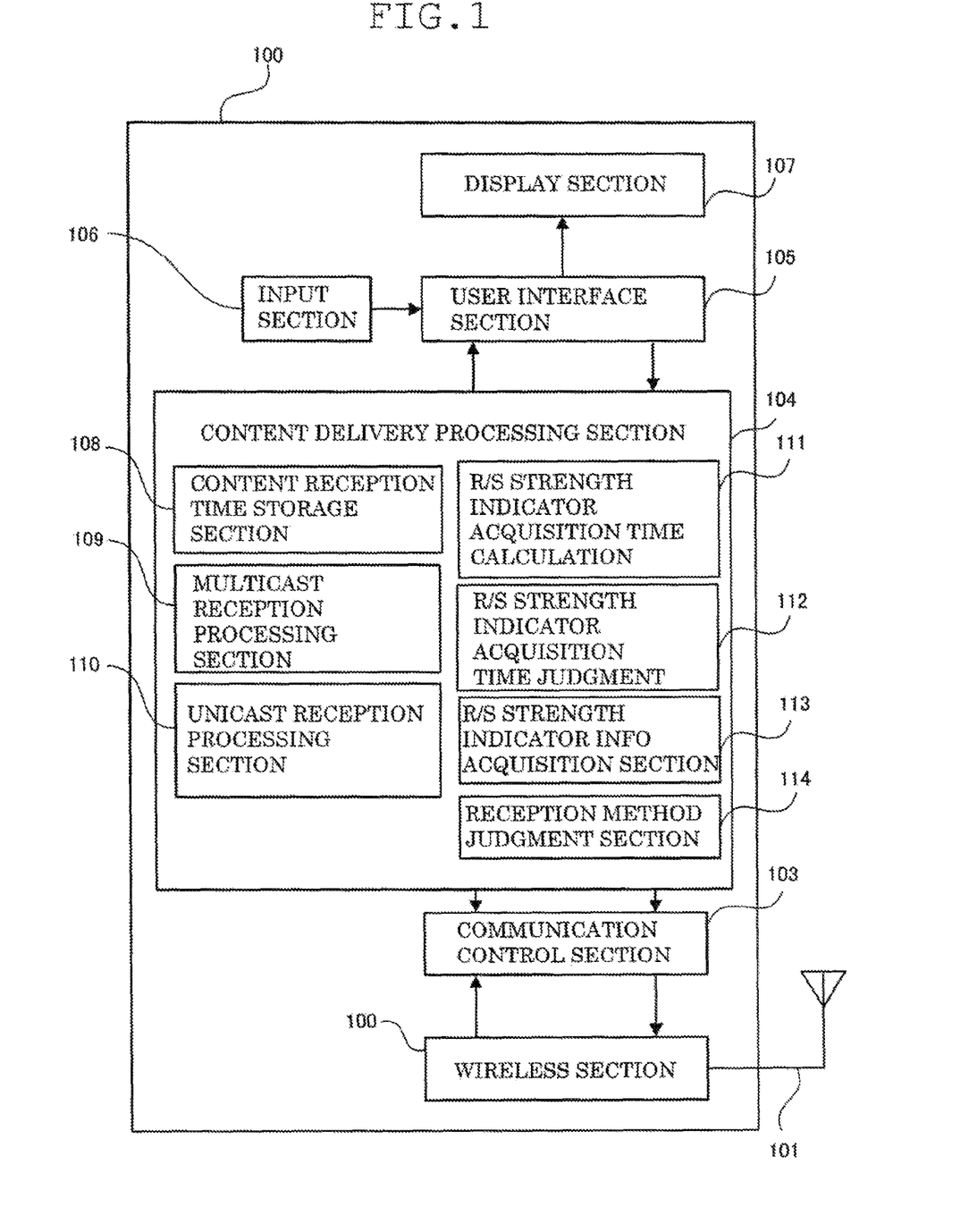
FIG. 1 is a block diagram of a configuration according to the first embodiment of the present invention.

FIG. 1 is a diagram of a configuration of a communication terminal 100 according to the first embodiment of the present invention. The communication terminal 100 comprises constituent parts 101 to 114. A wireless section 102 performs wireless communication via a transmitting and receiving antenna 101. Furthermore, the wireless section 102 incorporates a modulation/demodulation circuit and communication protocols required to utilize communication systems, such as time division multiple access (TDMA), code division multiple access (CDMA), and wireless local area network (LAN). A communication control section 103 acquires received signal strength indicator information, etc. from the wireless section 102 and controls and manages the communication state according to the state of the terminal.

A content delivery processing section 104 is a module that performs a streaming reception process, a file download-storage process of video and audio content files, etc. The content delivery processing section 104 comprises a content reception time storage section 108, a multicast reception processing section 109, a unicast reception processing section 110, a received signal strength indicator acquisition time calculation processing section 111, a received signal strength indicator acquisition time judgment section 112, a received signal strength indicator information acquisition section 113, and a reception method judgment section 114.

The content reception time storage section 108 receives and stores content delivery starting time information. The multicast reception processing section 109 performs a processing for receiving content by multicast delivery. The unicast reception processing section 110 performs a processing for receiving content by unicast delivery. The received signal strength indicator acquisition time calculation processing section 111 calculates the time at which a received signal strength indicator is acquired. The received signal strength indicator acquisition time judgment section 112 judges whether the time at which the received signal strength indicator is acquired matches the current time. The received signal strength indicator information acquisition section 113 acquires the received signal strength indicator information from the communication control section 103. The reception method judgment section 114 judges whether or not the received signal strength indicator information is larger than an arbitrary threshold x, and selects the reception system based on the judgment result of whether to receive by multicast or to receive by unicast.

A user interface section 105 prescribes a method of displaying information to the user and a user data input system. An input section 106 is a module that receives input from the user and notifies operational information, such as content reception termination and content reproduction start, from the user to the user interface 105. A display section 107 displays the information received from the user interface 105. For example, antenna bars indicating the received signal strength indicator information and a "successful content reception" when a content reception is successful are displayed.

A-2. Operations

Figure 2:
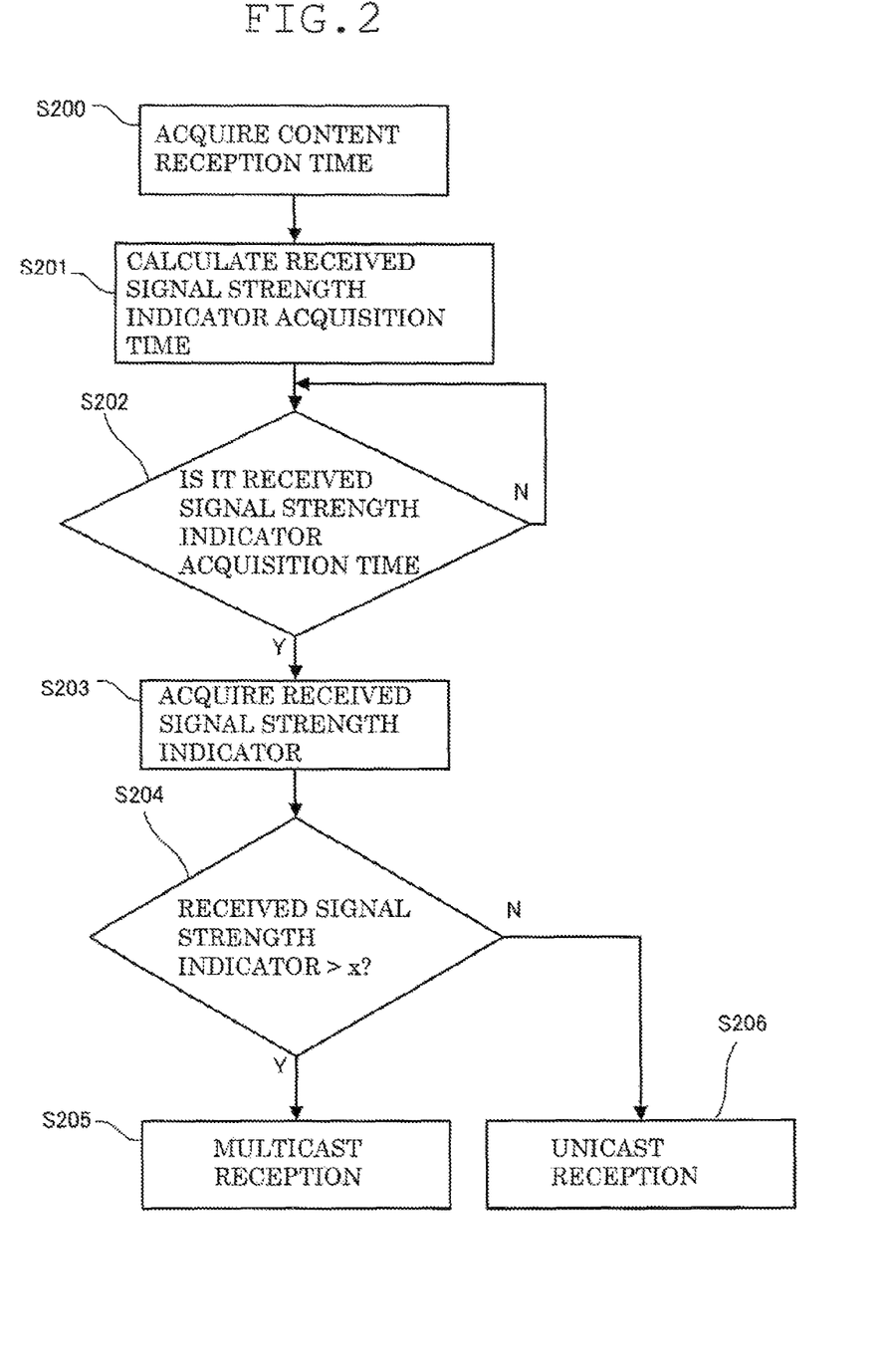
FIG. 2 is a flowchart of a content reception operation according to the first embodiment.

Next, a content reception operation performed by the content delivery processing section 104 comprising a multicast delivery function and a unicast delivery function is explained with reference to FIG. 2. First, at Step S200, the content reception time storage section 108 acquires content reception starting time information from a delivery source such as a base station. In a system where content can be received at a time desired by the terminal rather than the delivery time being specified by the delivery source, the reception time of which notification is given to the delivery source from the communication terminal is stored in the content reception time storage section 108.

Next, at Step S201, the received signal strength indicator acquisition time calculation processing section 111 calculates the time at which the received signal strength indicator information is acquired using the content reception starting time information. For example, when the received signal strength indicator information s seconds before the start of content reception is referenced, the time at which the received signal strength indicator information is acquired can be calculated by subtracting s seconds from the reception starting time information. Then, at Step S202, whether the current time matches the time at which the received signal strength indicator is acquired is judged by the received signal strength indicator acquisition time judgment section 112.

If judged at Step S202 that the times do not match, or namely, it is not time to acquire received signal strength indicator information, the received signal strength indicator acquisition time judgment section 112 judges again whether the current time matches the time at which the received signal strength indicator is acquired at Step S202. If judged at Step S202 that the times match, or namely, it is time to acquire received signal strength indicator information, the communication control section 103 in the received signal strength indicator information acquisition section 113 acquires the received signal strength indicator information at Step S203.

Here, the received signal strength indicator information refers to, for example, a received signal strength indicator (RSSI), a ratio of pilot signal energy to total energy (Ec/Io) and a carrier-to-interference energy ratio (C/I) that quantitatively express the positive and negative aspects of a mobile radio environment. These indicators per se do not necessarily have to be used and the number of antenna bars, etc. can also be used.

At Step S204, whether the received signal strength indicator information acquired at Step S203 is larger than the arbitrary threshold x is judged in the reception method judgment section 114. If judged at Step S204 that the received signal strength indicator is larger than the arbitrary threshold x, the process proceeds to Step S205 and reception is performed by multicast delivery in the multicast reception processing section 109.

On the other hand, if judged that the received signal strength indicator is smaller the arbitrary threshold x, the process proceeds, to Step S206 and reception is performed by unicast delivery in the unicast reception processing section 110. In other words, the content delivery source such as a base station is notified of a unicast reception request and content reception is performed through negotiation. When judged that the received signal strength indicator is larger than the arbitrary threshold x at Step S204, the mobile radio environment of the communication terminal is favorable, and thus, the probability that the content can be received successfully by multicast delivery is high.

At the same time, if judged that the received signal strength indicator is smaller than the arbitrary threshold x, contents may not be received successfully using multicast delivery because the mobile radio environment of the communication terminal is poor. In other words, an inefficient situation in which a multicast reception is performed in a poor mobile radio environment where a high probability of lost packets is foreseeable can be circumvented and an efficient retransmission request can be made. In addition, the base station-end can also significantly reduce the traffic load placed on communication paths by performing multicast delivery rather than unicast delivery when possible.

Although the judgment means for whether to perform multicast reception or unicast reception at Step S204 uses the received signal strength indicator information of the communication terminal s seconds prior to the start of content reception, other methods can be implemented. For example, the calculated average value of the received signal strength indicator from m seconds to n seconds prior to the start of content reception can be used; the mobile radio environment state can be judged from the number of antenna bars; or the received signal strength indicator information used to calculate the number of antenna bars can be used. Furthermore, fluctuations in the received signal strength indicators, or namely, received signal strength indicator variation, can be calculated by calculating a standard deviation of the received signal strength indicator from i seconds to j seconds prior to the start of content reception. Then, whether multicast reception is performed or unicast reception is performed can be judged using the standard deviation as a threshold. If the standard deviation is large, the variation in the received signal strength indicators is significant. The mobile radio environment is determined to be unstable, and thus, unicast reception is performed. On the other hand, if the standard deviation is small, the variation in the received signal strength indicators is small. Accordingly, the mobile radio environment is determined to be stable, and thus, multicast reception is performed.

In addition, whether to perform multicast reception or unicast reception can be judged by a combination of the received signal strength indicator and the standard deviation allowing a more reliable judgment.

As an alternative means of the received signal strength indicator information, remaining battery level can be used as well. When the remaining battery level is higher than a threshold y, or namely, when the terminal can still be driven for a long period of time, multicast reception is performed. When the remaining battery level is lower than a certain threshold, or in other words, the terminal cannot be driven for a long period, unicast reception that can almost certainly receive content is performed. In this way, efficient power consumption can be performed and user-friendliness can be enhanced. The present embodiment can be actualized by replacing all received signal strength indicator information in FIG. 1 and FIG. 2 with the remaining battery level. The processing flow in this case is the same as that using received signal strength indicator information.

In addition, when the remaining battery level is lower than a certain threshold, or in other words, when the terminal cannot be driven for a long period, unicast reception that can almost certainly receive content is performed. However, if the remaining battery level is larger than a certain threshold, or namely, the terminal can still be driven for a long period, multicast reception is not necessarily performed. This is because it cannot be said with certainty that the probability of a successful completion of a multicast content reception is high in a terminal that is in a poor mobile radio environment regardless of a high remaining battery level.

Therefore, when the remaining battery level is higher than an arbitrary threshold y, or namely, when the terminal can be driven for a long period, it is effective for the terminal whether multicast reception is performed or unicast reception is performed should be determined again by using the received signal strength indicator information, as described in the present embodiment. In other words, the judgment of whether unicast reception is performed or multicast reception is performed when receiving content in a content reception system comprising two reception functions, the multicast reception and the unicast reception, is made using remaining battery level information and received signal strength indicator information, and thus, the terminal of this invention can realize further reduction in the power consumption of the terminal and to provide a more efficient service to the user.

B. Second Embodiment

Next, a second embodiment is explained with reference to FIG. 3 to FIGS. 5A and 5B.

B-1. Configuration

Figure 3:
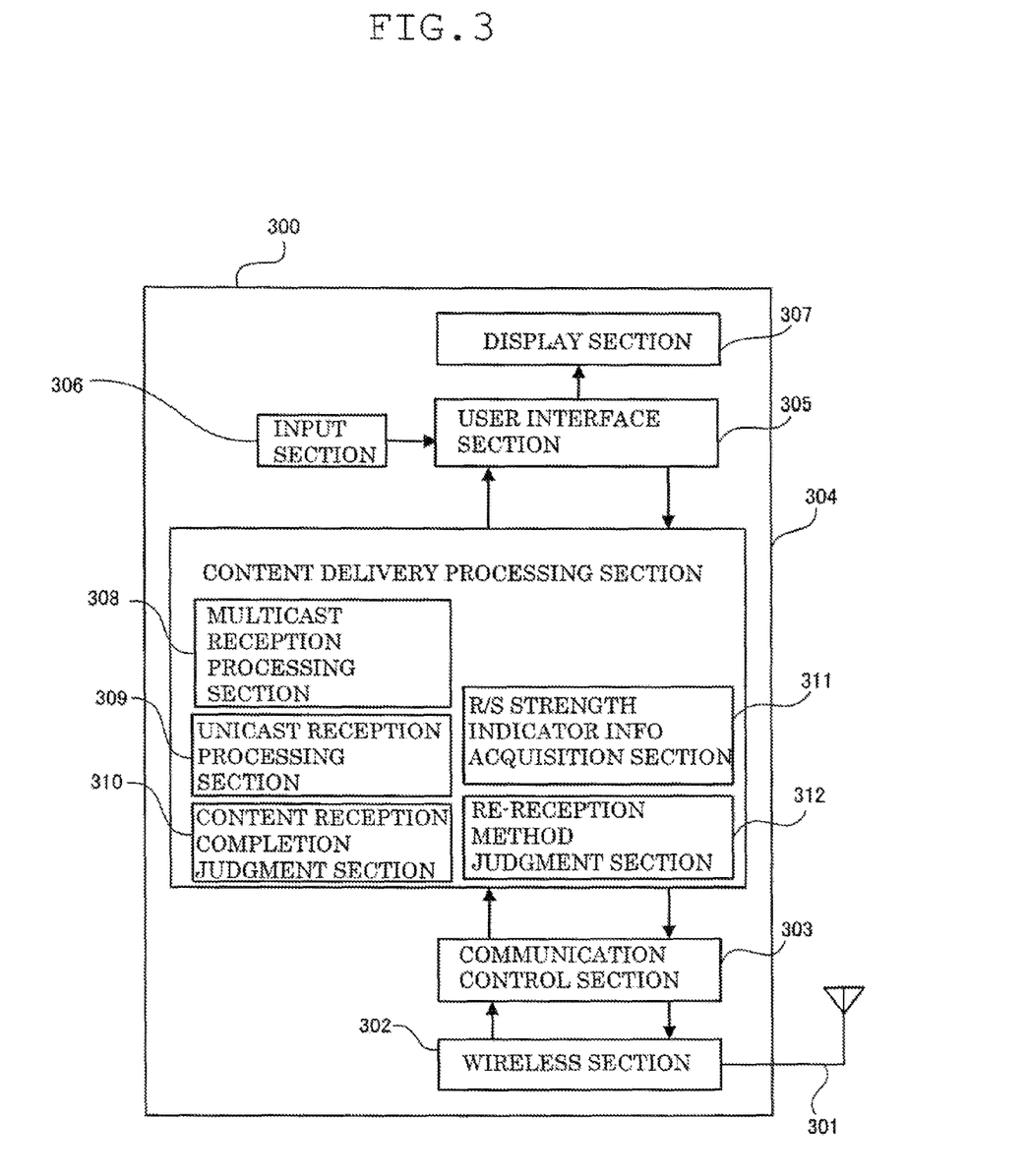
FIG. 3 is a block diagram of a configuration according to the second embodiment.

First, FIG. 3 is a block diagram of a configuration of a communication terminal 300 according to the second embodiment of the present invention. The communication terminal 300 comprises constituent parts 301 to 312. A wireless section 302 performs wireless communication via a transmitting and receiving antenna 301. Furthermore, the wireless section 302 incorporates a modulation/demodulation circuit and communication protocols required to utilize communication systems, such as TDMA, CDMA, and wireless LAN. A communication control section 303 is a module that acquires received signal strength indicator information, etc. from the wireless section 302 and controls and manages the communication state according to the state of the terminal.

A content delivery processing section 304 is a module that performs a streaming reception process and a file download and storage process of video and audio content files, etc. The content delivery processing section 304 comprises a multicast reception processing section 308, a unicast reception processing section 309, a content reception completion judgment section 310, a received signal strength indicator acquisition time judgment section 311, and a reception method re-judgment section 312.

The multicast reception section 308 performs a processing for receiving content by multicast delivery. The unicast reception processing section 309 performs a processing for receiving content by unicast delivery. The content reception completion judgment section 310 judges whether a content reception has been successfully completed. The received signal strength indicator information acquisition section 311 acquires the received signal strength indicator information from the communication control section 303. The reception method re-judgment section 312 judges whether or not the received signal strength indicator information is larger than an arbitrary threshold x and selects the reception system based on the judgment result of whether to perform multicast reception or to perform unicast reception.

A user interface section 305 prescribes a method of displaying information to the user and a user data input system. An input section 306 is a module that receives input from the user. Also, the input section 306 notifies the user operational information of how to operate the terminal, such as content reception termination and content reproduction start, from the user to the user interface 305. A display section 307 displays the information received from the user interface 305. For example, antenna bars indicating the received signal strength indicator information and a "successful content reception" when a content reception is successful are displayed.

B-2. Operations

Figure 4:
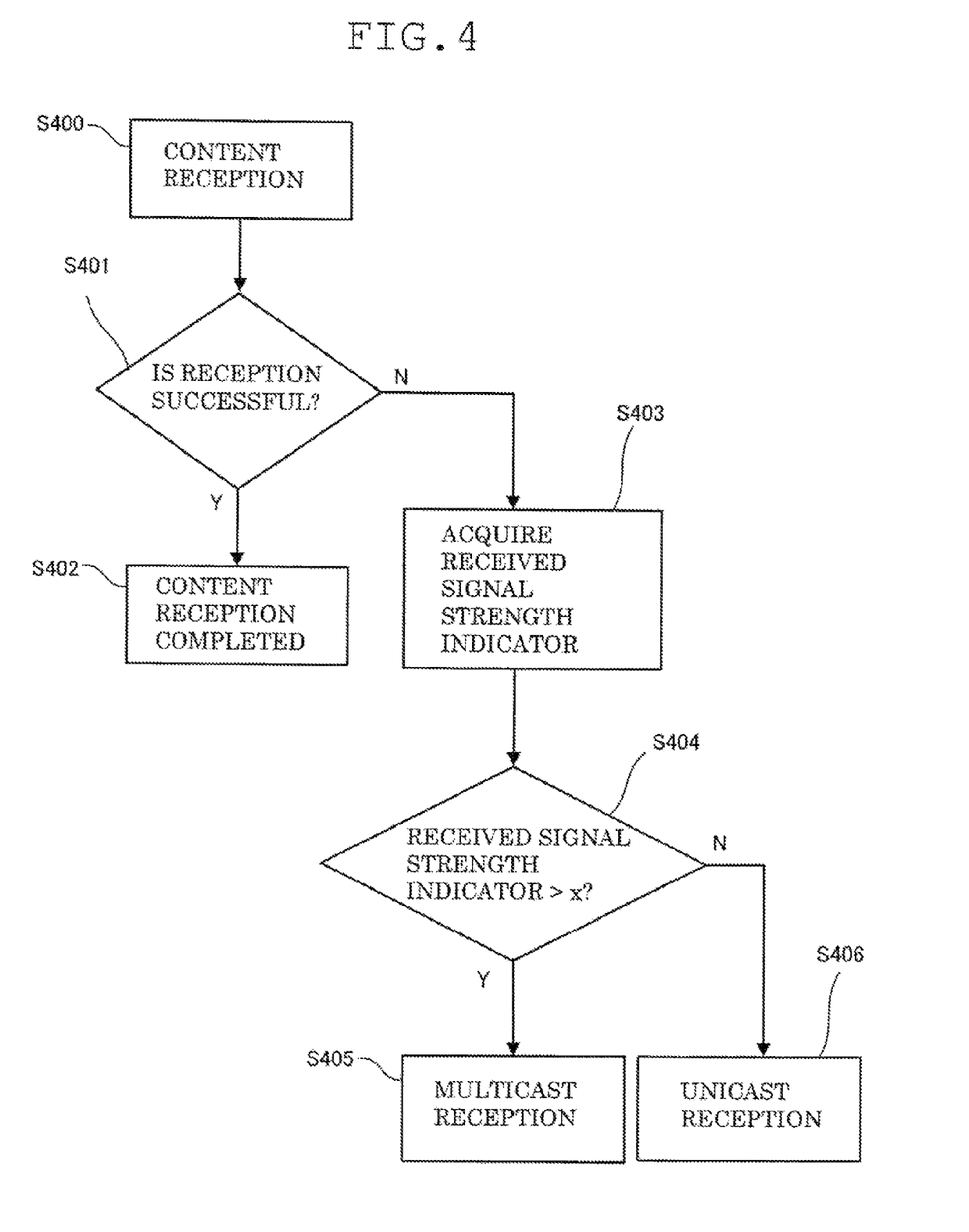
FIG. 4 is a flowchart of a content reception operation according to the second embodiment.
Figure 5A:
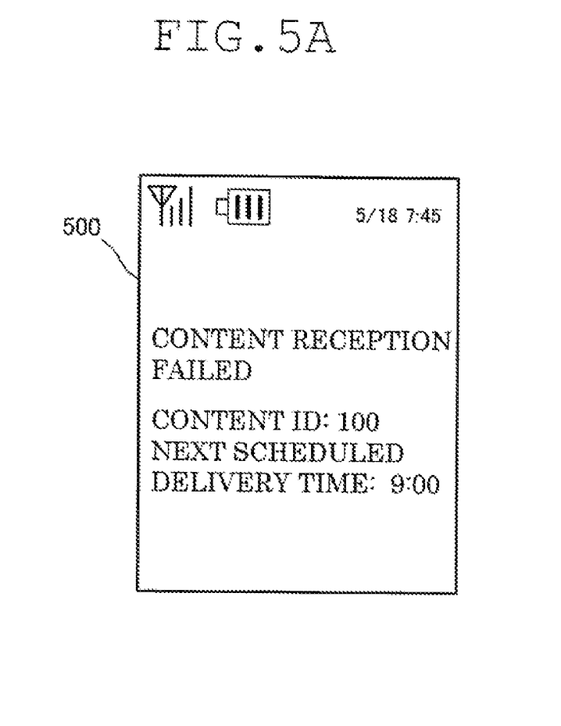
FIG. 5A and FIG. 5B are diagrams of display examples of a content reception results according to the second embodiment.
Figure 5B:
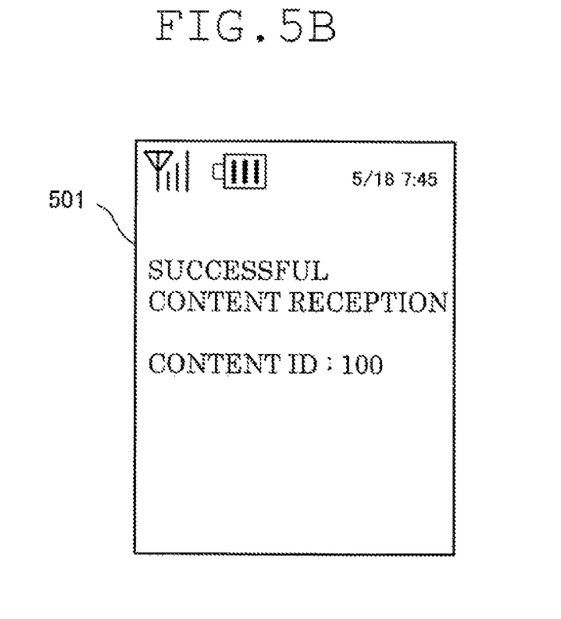

Next, a content reception operation of the content delivery processing section 304 is explained with reference to FIG. 4.

First, at Step S400, the multicast reception processing section 308 in the content delivery processing section 304 performs content reception. Next, the process proceeds to Step S401 and the content reception completion judgment section 310 judges whether content reception has been successfully completed. If judged at Step S401 that the content reception has been successfully completed, or namely, the content reception is successful in Step S402, the multicast reception processing section 308 performs processing to complete the content reception.

If judged at Step S401 that the content reception has been abnormally terminated, or namely, the content reception has failed, the process proceeds to a content re-reception process. If judged that content reception has failed, the process proceeds to Step S403 and the received signal strength indicator information during content reception failure is acquired from the communication control section 303 by the received signal strength indicator information acquisition section 311. Here, the received signal strength indicator information refers to, for example, a received signal strength indicator (RSSI), a ratio of pilot signal energy to total energy (Ec/Io), and a carrier-to-interference energy ratio (C/I) that quantitatively express the positive and negative aspects of a mobile radio environment. These indicators per se do not necessarily have to be used and the number of antenna bars, etc. can also be used.

Then, at Step S404, the reception method re-judgment section 312 judges whether the received signal strength indicator information acquired at Step S403 is larger than the arbitrary threshold x. If judged at Step S404 that the received signal strength indicator is larger than the arbitrary threshold x, the multicast reception processing section 309 performs reception by multicast delivery at Step S405. In other words, the content delivery source such as the base station is notified of a multicast reception request and content reception is performed through negotiation.

On the other hand, if judged at Step S404 that the reception signal strength indicator information is smaller than the arbitrary threshold x, the unicast reception processing section 310 performs a unicast reception at Step S406. In other words, the content delivery source such as the base station is notified of a unicast reception request and content reception is performed through negotiation.

If judged at Step S404 that the received signal strength indicator information is larger than the arbitrary threshold x, content reception is judged to have failed regardless of the favorable mobile radio environment of the communication terminal and content reception is attempted again by multicast delivery. On the other hand, if judged that the received signal strength indicator information is smaller than the arbitrary threshold x, since content reception has failed due to poor mobile radio environment of the communication terminal, it can be foreseen that content reception will fail again even if multicast delivery is performed again. Therefore, in this case, content reception is performed by unicast delivery.

In this way, the communication terminal can circumvent an inefficient situation in which a multicast reception is performed in a poor mobile radio environment where a high probability of lost packets is foreseeable and can make an efficient retransmission request. In addition, the base station-end can also significantly reduce the traffic load placed on communication paths by performing multicast delivery rather than unicast delivery when possible to terminals in a favorable mobile radio environment.

Although the received signal strength indicator information indicating positive and negative aspects of the mobile environment is used in Step S404 as the received signal strength indicator of the communication terminal during content reception failure, other methods can be implemented as well. For example, the calculated average value of the received signal strength indicator from m seconds to n seconds prior to the start of content reception can be used; the mobile radio environment state can be judged from the number of antenna bars; or the received signal strength indicator information used to calculate the number of antenna bars can be used.

Furthermore, fluctuations in the received signal strength indicators, or namely, the received signal strength indicator variation, can be calculated by calculating a standard deviation of the received signal strength indicator from i seconds to j seconds prior to the start of content reception. Then, whether multicast reception is performed or unicast reception is performed can be judged using the standard deviation as a threshold. If the standard deviation is large, the variation in the received signal strength indicators is significant. Accordingly, the mobile radio environment is determined to be unstable and thus, unicast reception is performed.

On the other hand, if the standard deviation is small, the variation in the received signal strength indicators is small. Accordingly, the mobile radio reception is determined to be stable and thus, multicast reception is performed. In addition, whether to perform multicast reception or unicast reception can be judged by a combination of the received signal strength indicator and the standard deviation allowing a more reliable judgment.

After the content reception is judged to be successful at Step S401, the content reception completion judgment section performs notification to the display section via the user interface section 305 to inform the user that file reception was successful, such as displaying "successful content reception". A display such as that shown in reference number 501 in FIG. 5B can be performed.

Service with enhanced user-friendliness can be provided to the user by performing a display as such. In addition, the user can select whether to display such information as desired by the input section 306. Service with enhanced user-friendliness can be provided to the user by allowing the selection of whether to perform such displays.

In addition, after the content reception is judged to have failed at Step S401, the content reception completion judgment section performs notification to the display section via the user interface section 305 to inform the user that file reception failed, such as displaying "content reception failed". A display such as that shown in reference number 500 in FIG. 5A can be performed. Furthermore, if the delivery source simultaneously gives notification of re-reception time information, a display that notifies the user of the next reception time can be performed as shown in the reference number 500 in FIG. 5A.

Service with enhanced user-friendliness can be provided to the user by performing displays as such. In addition, the user can select whether to display such information as desired by the input section 306. Service with enhanced user-friendliness can be provided to the user by allowing the selection of whether to perform such displays.

Although the content reception method is judged using the received signal strength indicator information at Step S404, the remaining battery level can also be used. In the case that the remaining battery level is higher than a certain threshold, or namely, the terminal can still be driven for a long period, multicast reception is performed. Furthermore, in the case that the remaining battery level is lower than a certain threshold, or namely, the terminal cannot be driven for a long period, unicast reception that can almost certainly receive content is performed. In this way, efficient power consumption can be performed and user-friendliness can be enhanced. The present embodiment can be actualized by replacing all received signal strength indicator information in FIG. 3 and FIG. 4 with the remaining battery level. The processing flow in this case is the same as that using received signal strength indicator information.

In addition, when the remaining battery level is lower than a certain threshold, or namely, when the terminal cannot be driven for a long period, unicast reception that can almost certainly receive content may be performed. However, when the remaining battery level is higher than a certain threshold, or namely, when the terminal can still be driven for a long period, multicast reception should not be necessarily performed. This is because it cannot be said with certainty that the probability of a successful completion of a multicast content reception is high in a terminal that is in a poor mobile radio environment regardless of a high remaining battery level.

Therefore, when the remaining battery level is higher than a certain threshold, or namely, when the terminal can be driven for a long period, it is effective for the terminal whether multicast reception is performed or unicast reception is performed should be determined again by using the received signal strength indicator information as described in the second embodiment. In other words, the judgment of whether unicast reception is performed or multicast reception is performed when receiving content in a content reception system comprising two reception functions, the multicast reception and the unicast reception, is made using remaining battery level information and received signal strength indicator information, and thus, the terminal of this invention can realize further reduction in the power consumption of the terminal and to provide a more efficient service to the user.

As explained above, the present invention can select an optimal reception system and reduce reception failure because whether to use multicast reception or unicast selection can be switched dynamically in consideration of the mobile radio environment condition of each terminal. In addition, by performing a dynamic switching of the reception method as such, the base station-end can perform multicast delivery rather than unicast delivery when possible to communication terminals in favorable mobile radio environments, thereby significantly reducing the traffic load placed on communication paths.

In addition, the power consumption of the terminal can be further reduced and a more efficient service can be provided to the user by using the first embodiment and the second embodiment in combination.

While the present invention has been described with reference to the preferred embodiments, it is intended that the invention be not limited by any of the details of the description therein but includes all the embodiments which fall within the scope of the appended claims.

What is claimed is:

1. A communication terminal which is capable of receiving content files, comprising:
    a content reception time acquisition means for acquiring a content reception time;
    a multicast reception means for receiving content by multicast delivery;
    a unicast reception means for receiving content by unicast delivery;
    a remaining battery level acquisition means for acquiring remaining battery level information on the remaining battery level for driving the communication terminal;
    a remaining battery level acquisition time calculation means for calculating the time at which the remaining battery level information is acquired using the content reception time information;
    a remaining battery level acquisition time judgment means for judging whether the current time is the time at which the remaining battery level information is acquired;
    a remaining battery level judgment means for judging whether or not there is remaining battery power using the remaining battery level information;
    a received signal strength indicator acquisition means for acquiring received signal strength indicator information from a signal acquired by the communication terminal; and
    a reception method judgment means for selecting either the multicast reception means or the unicast reception means according to a judgment result of a reception method selection using the received signal strength indicator information and the judgment result of the remaining battery level judgment means and instructing content reception.

2. A communication terminal which is capable of receiving content files, comprising:
    a multicast reception means, for receiving content by multicast delivery;
    a unicast reception means for receiving content by unicast delivery;
    a content reception completion judgment means for judging whether a content reception was successful;
    a remaining battery level acquisition means for acquiring remaining battery level information on the remaining battery level for driving the communication terminal;
    a remaining battery level judgment means for judging whether or not there is remaining battery power using the remaining battery level information when the content reception completion judgment means judges that the content reception was not completed successfully;
    a received signal strength indicator acquisition means for acquiring received signal strength indicator information from a signal acquired by the communication terminal; and
    a reception method judgment means for selecting either the multicast reception means or the unicast reception means according to a judgment result of a reception method selection using the received signal strength indicator information and the judgment result of the remaining battery level judgment means and instructing content reception when the content reception completion judgment means judges that the content reception was not completed successfully.

3. The communication terminal according to claim 2, further comprising:
    a display means for providing a user with various information;
    a content reception completion judgment means for judging whether a content reception was successful;
    a display control means for displaying a notification of a successful content reception in the display means when the content reception completion judgment means judges that the content reception was completed successfully.

4. The communication terminal according to claim 2, further comprising:
    a display means for providing a user with various information;
    a content reception completion judgment means for judging whether a content reception was successful; and
    a display control means for displaying a notification of a content reception failure in the display means when the content reception completion, judgment means judges that the content reception was completed abnormally.

5. The communication terminal according to claim 2, further comprising:
    a content reception completion judgment means for judging whether a content reception was successful;
    a content reception time storage means for receiving and storing content re-reception time; and
    a display control means for displaying the content re-reception time in the display means when the content reception completion judgment means judges that the content reception was completed abnormally.

* * * * *